US011893951B2

(12) United States Patent
Lim et al.

(10) Patent No.: US 11,893,951 B2
(45) Date of Patent: Feb. 6, 2024

(54) DISPLAY DEVICE CONFIGURED TO OUTPUT GATE SIGNALS TO AT LEAST TWO GATE LINES AT A TIME HAVING OUTPUT TIMINGS DIFFERENT FROM EACH OTHER, AND CONTROL METHOD THEREFOR

(71) Applicant: SAMSUNG ELECTRONICS CO., LTD., Suwon-si (KR)

(72) Inventors: Sungjin Lim, Suwon-si (KR); Changhoon Kim, Suwon-si (KR); Hyejin Kim, Suwon-si (KR); Jeongphil Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/104,492

(22) Filed: Feb. 1, 2023

(65) Prior Publication Data

US 2023/0178049 A1 Jun. 8, 2023

Related U.S. Application Data

(63) Continuation of application No. PCT/KR2021/012611, filed on Sep. 15, 2021.

(30) Foreign Application Priority Data

Oct. 14, 2020 (KR) ........................ 10-2020-0132580

(51) Int. Cl.
*G09G 3/36* (2006.01)

(52) U.S. Cl.
CPC ......... *G09G 3/3677* (2013.01); *G09G 3/3688* (2013.01); *G09G 2340/0435* (2013.01)

(58) Field of Classification Search
None
See application file for complete search history.

(56) References Cited

U.S. PATENT DOCUMENTS 6,903,716 B2 6/2005 Kawabe et al.
7,327,338 B2 2/2008 Moon
(Continued)

FOREIGN PATENT DOCUMENTS

KR 10-0498296 B1 7/2005
KR 10-0542535 B1 1/2006
(Continued)

OTHER PUBLICATIONS

International Search Report dated Dec. 16, 2021 in PCT application PCT/KR2021/012611, 2 pages.
(Continued)

*Primary Examiner* — Kirk W Hermann
(74) *Attorney, Agent, or Firm* — Nixon & Vanderhye P.C.

(57) ABSTRACT

A display device comprises: a panel driving unit comprising panel driving circuitry; a display panel including a plurality of pixels; and a processor configured to control the panel driving unit, wherein: the processor is configured to: control the panel driving unit so that gate signals are sequentially output to a plurality of gate lines one gate line at a time, to process, in a first mode, image data in a first driving frequency, and control the panel driving unit so that the gate signals are output to the plurality of gate lines at least two gate lines at a time, to process, in a second mode, the image data in a second driving frequency higher than the first driving frequency; wherein, in the second mode, the respective gate lines output to the plurality of gate lines at least two gate lines at a time can have output timings that differ from each other.

14 Claims, 8 Drawing Sheets

(56) References Cited

U.S. PATENT DOCUMENTS

| | | | | |
|---|---|---|---|---|
| 7,495,646 | B2 | 2/2009 | Kawabe et al. | |
| 9,153,189 | B2 | 10/2015 | Moon | |
| 9,288,403 | B2 | 3/2016 | Maeyama | |
| 9,494,833 | B2 | 11/2016 | Yamazaki et al. | |
| 9,767,747 | B2 | 9/2017 | Oh et al. | |
| 11,341,928 | B2 | 5/2022 | Lee et al. | |
| 2003/0169247 | A1* | 9/2003 | Kawabe | G09G 3/342 345/204 |
| 2003/0179221 | A1* | 9/2003 | Nitta | G09G 3/3648 345/690 |
| 2004/0041774 | A1 | 3/2004 | Moon | |
| 2005/0219188 | A1 | 10/2005 | Kawabe et al. | |
| 2006/0146040 | A1 | 7/2006 | Shen | |
| 2008/0036717 | A1 | 2/2008 | Moon | |
| 2009/0244112 | A1 | 10/2009 | Jung et al. | |
| 2010/0295837 | A1 | 11/2010 | Yoshinaga et al. | |
| 2011/0169871 | A1* | 7/2011 | Suzuki | G09G 3/3648 345/690 |
| 2013/0328850 | A1* | 12/2013 | You | G02F 1/13624 345/211 |
| 2015/0080103 | A1* | 3/2015 | Nakamura | G07F 17/3213 463/20 |
| 2015/0124124 | A1* | 5/2015 | Maeyama | H04N 23/743 348/235 |
| 2016/0005368 | A1* | 1/2016 | Park | G02F 1/13306 345/209 |
| 2016/0021328 | A1 | 1/2016 | Shen | |
| 2016/0035297 | A1 | 2/2016 | Oh et al. | |
| 2017/0243529 | A1* | 8/2017 | Hung | G09G 3/20 |
| 2018/0204499 | A1* | 7/2018 | Bae | G09G 3/3648 |
| 2021/0295794 | A1 | 9/2021 | Lee et al. | |

FOREIGN PATENT DOCUMENTS

| | | | | |
|---|---|---|---|---|
| KR | 10-2006-0027825 | A | | 3/2006 |
| KR | 10-0796298 | B1 | | 1/2008 |
| KR | 10-2009-0102083 | A | | 9/2009 |
| KR | 10-2015-0053225 | A | | 5/2015 |
| KR | 10-2015-0069591 | A | | 6/2015 |
| KR | 10-2015-0069994 | A | | 6/2015 |
| KR | 20150080103 | A | * | 7/2015 |
| KR | 10-1560403 | B1 | | 10/2015 |
| KR | 10-2018-0036396 | A | | 4/2018 |
| KR | 10-2020-0011777 | A | | 2/2020 |
| KR | 10-2020-0025351 | A | | 3/2020 |
| KR | 10-2022-0036257 | A | | 3/2022 |

OTHER PUBLICATIONS

Written Opinion dated Dec. 16, 2021 in PCT application PCT/KR2021/012611, 4 pages.

* cited by examiner

DISPLAY DEVICE CONFIGURED TO OUTPUT GATE SIGNALS TO AT LEAST TWO GATE LINES AT A TIME HAVING OUTPUT TIMINGS DIFFERENT FROM EACH OTHER, AND CONTROL METHOD THEREFOR

CROSS-REFERENCE TO RELATED APPLICATIONS

This application is a continuation of International Application No. PCT/KR2021/012611 designating the United States, filed on Sep. 15, 2021, in the Korean Intellectual Property Receiving Office and claiming priority to Korean Patent Application No. 10-2020-0132580, filed on Oct. 14, 2020, in the Korean Intellectual Property Office, the disclosures of which are incorporated by reference herein in their entireties.

BACKGROUND

Field

The disclosure relates to a display device and a control method therefor, and for example, to a display device that can display an image through high speed driving, and a control method therefor.

Description of Related Art

As electronic technologies have been developed recently, images having a high frame rate (HFR) are being provided. Such an image can be reproduced without discontinuity by a display device that can process image data in a frequency such as 120 (Hz) or 240 (Hz), e.g., that can be driven at a high speed.

However, a conventional display device could only process image data according to a predetermined driving frequency or a frequency lower than a predetermined driving frequency, and thus in case a driving frequency of, for example, 60 (Hz) was set, there was a problem that the display device could not operate in a driving frequency of 120 (Hz) or higher.

This causes a problem that a discontinuity phenomenon occurs when a game image, a sport image, etc. having a high frame rate (or, having high frames per second) are reproduced, and users cannot enjoy the images smoothly.

SUMMARY

Embodiments of the disclosure provide a display device that can smoothly reproduce an image having a high frame rate without discontinuity through high speed driving, and a control method therefor.

A display device according to an example embodiment of the disclosure includes: a panel driving unit comprising panel driving circuitry, a display panel including a plurality of pixels connected with a plurality of gate lines and a plurality of data lines through a plurality of switching elements comprising switch circuitry, and a processor configured to: control the panel driving unit to output gate signals through the plurality of gate lines, and control the panel driving unit to apply, through the plurality of data lines, a data voltage to the plurality of pixels connected with the plurality of switching elements to which the gate signals were output, wherein the processor may, in a first mode, be configured to: control the panel driving unit to sequentially output gate signals to the plurality of gate lines one gate line at a time in order to process image data in a first driving frequency, and in a second mode, control the panel driving part to output gate signals to the plurality of gate lines at least two gate lines at a time in order to process image data in a second driving frequency higher than the first driving frequency, wherein in the second mode, the respective gate signals output to the plurality of gate lines at least two gate lines at a time may have output timings different from each other.

The processor may be configured to: while operating in the first mode, control the panel driving unit to apply a data voltage to the plurality of pixels based on the output timings of the gate signals sequentially output to the plurality of switching elements one gate line at a time, and while operating in the second mode, control the panel driving unit to apply a data voltage to the plurality of pixels based on the different output timings of the respective gate signals output to the plurality of switching elements at least two gate lines at a time.

The gate lines may include a first gate line and a second gate line, and the processor may be configured to: while operating in the first mode, control the panel driving unit to output a first gate signal to a plurality of switching elements connected to the first gate line through the first gate line at a first timing, so that a first data voltage is charged in a plurality of pixels connected with the first gate line, and control the panel driving unit to output a second gate signal to a plurality of switching elements connected to the second gate line through the second gate line at a second timing, so that a second data voltage is charged in a plurality of pixels connected with the second gate line.

The gate lines may include a first gate line and a second gate line, and the processor may be configured to: while operating in the second mode, control the panel driving unit to output a first gate signal to a plurality of switching elements connected to the first gate line through the first gate line at a first timing, so that a first data voltage is charged in a plurality of pixels connected with the first gate line, and control the panel driving unit to output a second gate signal to a plurality of switching elements connected to the second gate line through the second gate line at a second timing, so that the first data voltage and a second data voltage are charged in a plurality of pixels connected with the second gate line.

The plurality of pixels connected with the second gate line may be charged by the first data voltage during a first time based on the second timing, and may be charged by the second data voltage during a second time.

The gate lines may further include a third gate line, and the processor may be configured to control the panel driving unit to output a third gate signal to a plurality of switching elements connected to the third gate line through the third gate line at a third timing, so that the second data voltage is charged in a plurality of pixels connected with the third gate line.

The plurality of pixels connected with the second gate line may be charged by a third value between a first value by which the plurality of pixels connected to the first gate line are charged by the first data voltage and a second value by which the plurality of pixels connected to the third gate line are charged by the second data voltage.

The processor may be configured to: based on receiving image data from the outside, perform an automatic content recognition (ACR) function and determine a type of the image data, based on the type of the image data being determined as a first type, operate in the first mode and process the image data in the first driving frequency, and based on the type of the image data being determined as a second type, operate in the second mode and process the image data in the second driving frequency.

The processor may be configured to: based on receiving image data from the outside, determine frames per second (fps) of the image data, and based on the fps of the image data being a first value, operate in the first mode and process the image data in the first driving frequency, and based on the fps of the image data being a second value, operate in the second mode and process the image data in the second driving frequency.

The processor may be configured to: based on receiving first image data having an fps of a first value from the outside, convert the image data into second image data having an fps of a second value, and process the second image data in the second driving frequency.

A method of controlling a display device according to an example embodiment of the disclosure includes: outputting gate signals through a plurality of gate lines, and applying, through a plurality of data lines, a data voltage to a plurality of pixels connected with a plurality of switching elements to which the gate signals were output, wherein, in the outputting the gate signals, in a first mode, gate signals may be sequentially output to the plurality of gate lines one gate line at a time to process image data in a first driving frequency, and in a second mode, gate signals may be output to the plurality of gate lines at least two gate lines at a time to process image data in a second driving frequency higher than the first driving frequency, wherein in the second mode, the respective gate signals output to the plurality of gate lines at least two gate lines at a time may have output timings different from each other.

In applying the data voltage, while operating in the first mode, a data voltage may be applied to the plurality of pixels based on the output timings of the gate signals sequentially output to the plurality of switching elements one gate line at a time, and while operating in the second mode, a data voltage may be applied to the plurality of pixels based on the different output timings of the respective gate signals output to the plurality of switching elements at least two gate lines at a time.

The gate lines may include a first gate line and a second gate line, and in the outputting the gate signals, while operating in the first mode, a first gate signal may be output to a plurality of switching elements connected to the first gate line through the first gate line at a first timing, so that a first data voltage is charged in a plurality of pixels connected with the first gate line, and a second gate signal may be output to a plurality of switching elements connected to the second gate line through the second gate line at a second timing, so that a second data voltage is charged in a plurality of pixels connected with the second gate line.

The gate lines may include a first gate line and a second gate line, and in the outputting the gate signals, while operating in the second mode, a first gate signal may be output to a plurality of switching elements connected to the first gate line through the first gate line at a first timing, so that a first data voltage is charged in a plurality of pixels connected with the first gate line, and a second gate signal may be output to a plurality of switching elements connected to the second gate line through the second gate line at a second timing, so that the first data voltage and a second data voltage are charged in a plurality of pixels connected with the second gate line.

The plurality of pixels connected with the second gate line may be charged by the first data voltage during a first time based on the second timing, and may be charged by the second data voltage during a second time.

The gate lines may further include a third gate line, and in the outputting the gate signals, a third gate signal may be output to the plurality of switching elements connected to the third gate line through the third gate line at a third timing, so that the second data voltage is charged in the plurality of pixels connected with the third gate line.

The plurality of pixels connected with the second gate line may be charged by a third value between a first value by which the plurality of pixels connected to the first gate line are charged by the first data voltage and a second value by which the plurality of pixels connected to the third gate line are charged by the second data voltage.

The example method of controlling a display device may further include: based on receiving image data from the outside, performing an automatic content recognition (ACR) function and determining a type of the image data, based on the type of the image data being determined as a first type, operating in the first mode and processing the image data in the first driving frequency, and based on the type of the image data being determined as a second type, operating in the second mode and processing the image data in the second driving frequency.

The example method of controlling a display device may further include: based on receiving image data from the outside, determining frames per second (fps) of the image data, and based on the fps of the image data being a first value, operating in the first mode and processing the image data in the first driving frequency, and based on the fps of the image data being a second value, operating in the second mode and processing the image data in the second driving frequency.

The example method of controlling a display device may further include, based on receiving first image data having fps of a first value from the outside, converting the image data into second image data having fps of a second value, and processing the second image data in the second driving frequency.

According to various example embodiments of the disclosure as described above, a display device that can smoothly reproduce an image having a high frame rate without discontinuity, and a control method therefor can be provided.

According to various embodiments of the disclosure, output timings of respective gate signals output at least two gate lines at a time are controlled differently, and thus degradation of a resolution that may occur as the respective gate signals are output at the same timing can be compensated.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Terms used in this disclosure and the claims, general terms were selected in consideration of the functions described in the disclosure. However, the terms may vary depending on the intention of those skilled in the art, legal or technical interpretation, and emergence of new technologies, etc. Terms may be arbitrarily designated, and the meaning of such terms may be interpreted based on the disclosure. Terms that are not specifically defined in the disclosure may be interpreted based on the overall content of this disclosure and common technical knowledge in the pertinent art.

In addition, in case it is determined that in describing the disclosure, detailed explanation of related known functions or configurations may unnecessarily confuse the gist of the disclosure, the detailed explanation may be abridged or omitted.

Further, while various example embodiments of the disclosure will be described in detail with reference to the following accompanying drawings and the content described in the accompanying drawings, it is not intended that the disclosure is restricted or limited by the embodiments.

Hereinafter, the disclosure will be described in greater detail with reference to the accompanying drawings.

Figure 1:
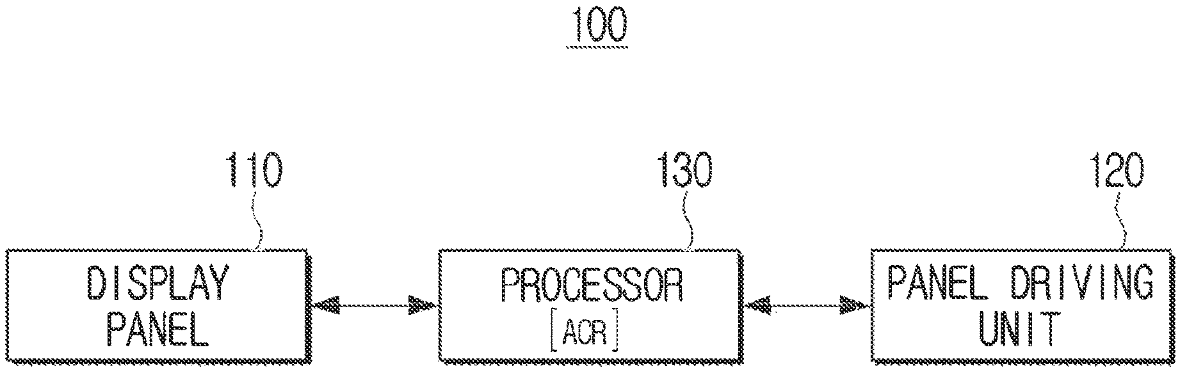
FIG. 1 is a block diagram illustrating an example configuration of a display device according to various embodiments.
Figure 2:
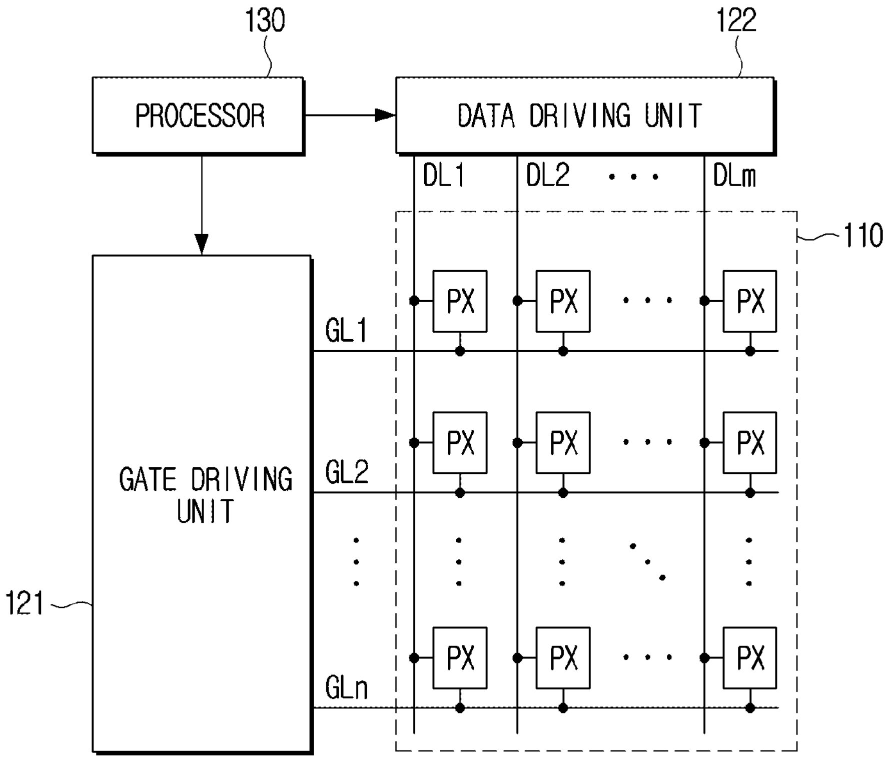
FIG. 2 is a diagram illustrating driving of a display device according to various embodiments.

FIG. 1 is a block diagram illustrating an example configuration of a display device according to various embodiments, and FIG. 2 is a diagram illustrating example driving of a display device according to various embodiments.

According to an embodiment, the display device 100 may be various types of electronic devices including, for example, and without limitation, a display such as a TV, a monitor, a laptop computer, a tablet, a PDA, a smartphone, etc.

Referring to FIG. 1, the display device 100 according to an embodiment of the disclosure may include a display panel 110, a panel driving unit (e.g., including panel driving circuitry) 120, and a processor (e.g., including processing circuitry) 130.

The display panel 110 may display various images. As an example, the display panel 110 may not only display a pre-stored image, but also an image received from an external device. The external device may be various types of electronic devices that can transmit an image to the display device 100 such as, for example, and without limitation, a server, a computer, a laptop computer, a smartphone, etc.

An image may include at least one of a still image or a moving image, and the display panel 110 may display various images such as a broadcasting content, a multimedia content, etc. The display panel 110 may display various types of user interfaces (UIs) and icons.

For example, the display panel 110 may, for example, display an image having a high frame rate (HFR) by the panel driving unit 120 that operates in a driving frequency of 120 (Hz) or 240 (Hz). An HFR image may refer, for example, to an image of which fps is, for example, 120 frames or more, and as an example, it may be a game image, a sport image, etc., but is not necessarily limited thereto.

The display panel 110 as described above may be implemented as a display in the form of a liquid crystal display (LCD) panel. However, depending on embodiments, the display panel 110 may be implemented as various forms of displays such as, for example, and without limitation, a light emitting diode (LED), organic light emitting diodes (OLED), Liquid Crystal on Silicon (LCoS), digital light processing (DLP), etc. Also, inside the display 110, driving circuits that may be implemented in forms such as an a-si TFT, a low temperature poly silicon (LTPS) TFT, an organic TFT (OTFT), etc., a backlight unit, etc. may also be included.

The display panel 110 may be coupled with a touch detection unit (e.g., including various circuitry), and implemented as a touch screen.

The display panel 110 may include a plurality of pixels connected with a plurality of gate lines and a plurality of data lines through a plurality of switching elements.

The panel driving unit 120 may display an image through the plurality of pixels included in the display panel 110.

Referring to FIG. 2, the panel driving unit 120 may include a gate driving unit (e.g., including gate driving circuitry) 121 that is connected with the switching elements (e.g., switching circuitry) included in each pixel PX through a plurality of gate lines GL1, GL2, . . . , GLn, and a data driving unit (e.g., including data driving circuitry) 122 that is connected with the switching elements included in each pixel PX through a plurality of data lines DL1, DL2, . . . , DLn.

The pixels may include switching elements, pixel electrodes connected to the switching elements, and common electrodes.

The switching elements may include, for example, and without limitation, thin film transistors (TFTs).

The switching elements may be turned on by a gate signal output through a gate line. In this case, as will be described in greater detail below, the plurality of data lines connected to the data driving unit 122 may be electronically connected with a plurality of turned-on switches, and the data driving unit 122 may apply (or, charge) a data voltage to the pixel electrode (e.g., a capacitor) included in each pixel along the plurality of data lines. For this, a first terminal of the switching elements may be connected with a gate line, and a second terminal of the switching elements may be connected with a data line.

The switching elements may be turned off when a gate low signal is output through a gate line, and in this case, the data voltage charged in the pixel electrodes may be maintained during a specific time.

The gate driving unit 121 may receive a gate driving control signal from the processor 130. The gate driving control signal may include a scan initiating signal including information on start of scan, and a clock control signal for controlling the output time of a gate signal.

The gate driving unit 121 may adjust the output timing of a gate signal according to a scan initiating signal. Here, the gate signal is an example, and it may be sequentially output to the switching elements included in each pixel PX through at least one gate line as a pulse signal.

In this case, the switching elements may be turned on by the gate signal output through the gate line, and the data lines and the pixel electrodes may be electronically connected.

According to an embodiment of the disclosure, while the display device 100 is operating in the first mode, the gate driving unit 121 may sequentially output gate signals one gate line at a time. This will be explained in greater detail below with reference to FIG. 4.

While the display device 100 is operating in the second mode, the gate driving unit 121 may output gate signals at least two gate lines at a time. This will be described in greater detail below with reference to FIG. 3.

The data driving unit 122 may receive a data driving control signal and a digital image signal from the processor 130. The digital image signal may include information on a plurality of gray scale values corresponding to a plurality of pixels located in at least one matrix (or, a horizontal line) among the plurality of pixels.

The data driving unit 122 may obtain a data voltage (or, a gray scale voltage) corresponding to the digital image signal based on the information on the plurality of gray scale values included in the digital image signal. The data driving unit 122 may apply the data voltage to the plurality of pixel electrodes included in the plurality of pixels through the plurality of data lines.

The pixels including the pixel electrodes to which the data voltage is applied may be pixels including the switching elements that were turned on according to the gate signal.

The data voltage applied through the plurality of data lines may be applied, through the turned-on switching elements, to the pixel electrodes of the pixels including the switching elements. For this, the third terminal of the switching elements may be connected to the pixel electrodes included in each pixel.

According to a difference between a data voltage applied to the pixel electrodes and a common voltage applied to the common electrodes, the liquid crystal particles included in each pixel may vary their alignments. Accordingly, the light transmittance rates of each pixel change, and the display panel 110 implements a gray scale according to the change of the light transmittance rates.

The processor 130 may include various processing circuitry and controls the overall operations of the display device 100. The processor 130 may control hardware or software components connected to the processor 130 by driving an operating system or an application program, and perform various kinds of data processing and operations. The processor 130 may load an instruction or data received from at least one of other components on a volatile memory and process them, and store various data in a non-volatile memory. The processor 130 may be a timing controller, for example, but is not necessarily limited thereto.

The processor 120 may control the panel driving unit 120 (e.g., the gate driving unit 121) to output a gate signal through the plurality of gate lines, and control the panel driving unit 120 (e.g., the data driving unit 122) to apply, through the plurality of data lines, a data voltage to the plurality of pixels connected with the plurality of switching elements to which the gate signal was output.

For example, the processor 130 may process a digital image signal (or, image data) received from the outside, and generate a digital image signal corresponding to each pixel of the display panel 110. The processor 130 may generate a gate driving control signal and a data driving control signal based on a horizontal synchronization signal, a vertical synchronization signal, and a clock signal received from the outside, transmit the gate driving control signal to the gate driving unit 121, and transmit the digital image signal and the data driving control signal to the data driving unit 122.

The gate driving control signal may include a scan initiating signal including information on start of scan, and a clock control signal controlling the output time of a gate signal. The gate driving unit 121 may output gate signals at least one gate line at a time or at least two gate lines at a time at a proper timing according to the scan initiating signal or the clock control signal.

In this case, the plurality of switching elements connected with the gate lines outputting gate signals may be turned on.

The data driving control signal may, for example, include a horizontal synchronization initiating signal including information on start of transmission of data, and a control signal controlling application of a data voltage through the plurality of data lines.

The data driving unit 122 may apply a data voltage to the plurality of pixels through the plurality of data lines at a proper timing according to the horizontal synchronization initiating signal and the control signal. The pixels to which the data voltage is applied may be pixels connected with the switching elements that were turned on as the gate signals were output.

The processor 130 may process image data received from the outside in a high speed driving frequency.

For example, the processor 130 may process image data in a second frequency that is higher than a first frequency set in the display device 100 in advance. The first frequency may, for example, be 60 (Hz), and the second frequency may, for example, be 120 (Hz). However, this is merely an example, and the first and second frequencies may be diverse depending on embodiments, such as an example wherein the first frequency is 120 (Hz), and the second frequency is 240 (Hz), etc.

The processor 130 may control the panel driving unit 120 to output gate signals at least two gate lines at a time. For example, the processor 130 may control the panel driving unit 120 to output gate signals having different output timings at least two gate lines at a time. Here, the panel driving unit 120 may be the aforementioned gate driving unit 121.

As an example, the processor 130 may control the gate driving unit 121 to output gate signals two gate lines at a time. The respective gate signals output to the plurality of gate lines two gate lines at a time may have output timings different from each other, as described above.

For example, the processor 130 may transmit a scan initiating signal including information on start of scan, and a clock control signal for outputting gate signals at least two gate lines at a time to the gate driving unit 121, and the gate driving unit 121 may output gate signals having different timings two gate lines at a time according to the scan initiating signal and the clock control signal.

The processor 130 may control the panel driving unit 120 (e.g., the data driving unit 122) to apply a data voltage to the plurality of pixels based on the different output timings of the respective gate signals that are output to the plurality of switching elements at least two gate lines at a time.

Figure 3:
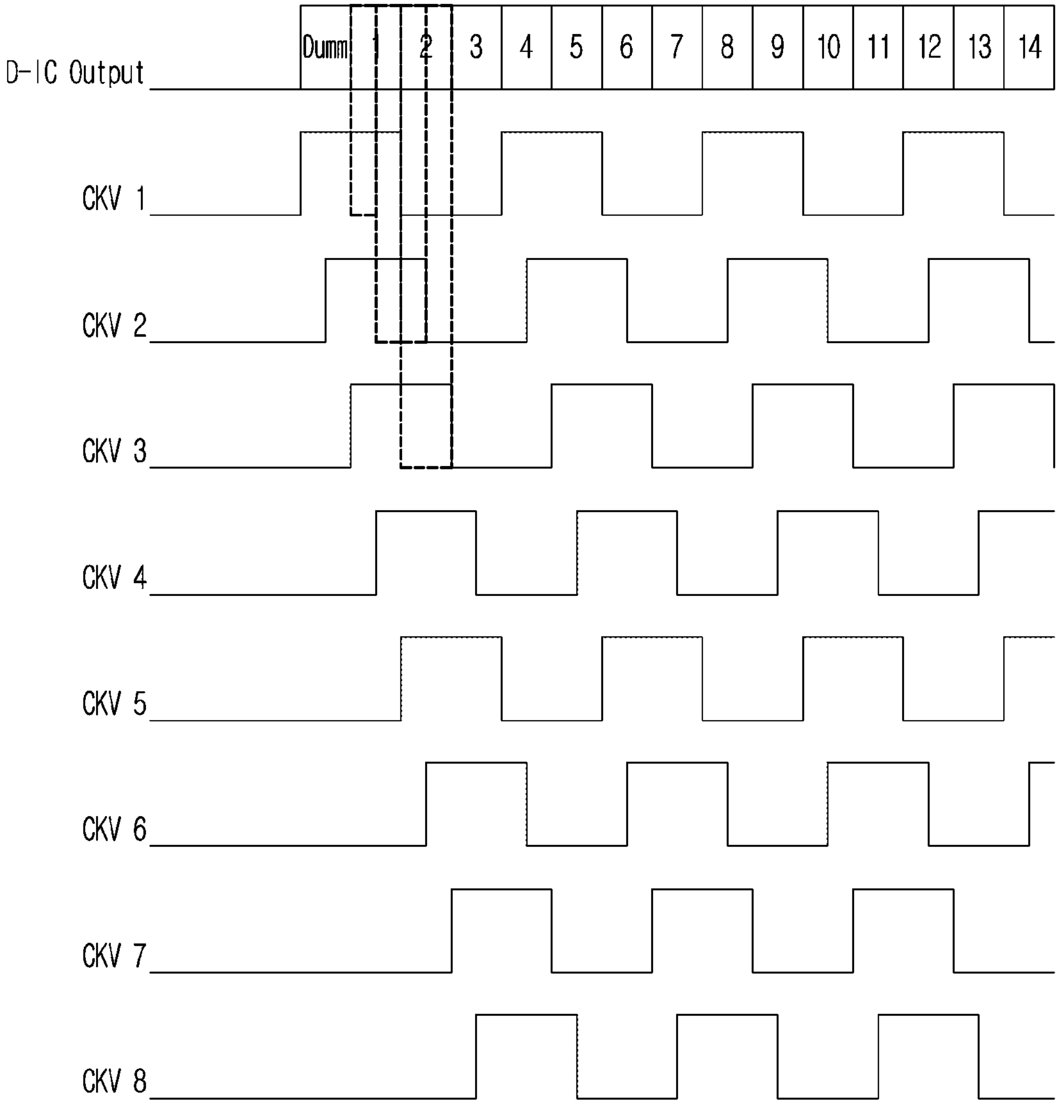
FIG. 3 is a diagram illustrating an example of outputting gate signals at least two gate lines at a time according to various embodiments.

As an example, referring to FIG. 3, the gate driving unit 121 according to an embodiment of the disclosure may be connected with first to eighth gate lines, and the processor 130 may control the gate driving unit 121 to output gate signals having different output timings two gate lines at a time.

For example, the processor 130 may control the panel driving unit 120 to output a first gate signal CKV1 to the plurality of switching elements connected with the first gate line through the first gate line at a first timing, so that a first data voltage is charged in the plurality of pixels connected with the first gate line, and control the panel driving unit 120 to output a second gate signal CKV2 to the plurality of switching elements connected to the second gate line through the second gate line at a second timing, so that a part of the first data voltage and a part of a second data voltage are charged in the plurality of pixels connected with the second gate line.

For example, the processor 130 may control the gate driving unit 121 to output the gate signal CKV1 to the plurality of switching elements connected with the first gate line through the first gate line at the first timing, and control the gate driving unit 121 to output the second gate signal CKV2 to the plurality of switching elements connected to the second gate line through the second gate line at the second timing that is later than the first timing. The second timing may be a faster timing than a third timing of outputting a gate signal CKV3 through a third gate line that will be described in greater detail below.

In this case, the plurality of switching elements connected with the first and second gate lines may be turned on by the gate signals CKV1, CKV2 output through the gate lines. For example, the plurality of switching elements connected with the first gate line may be turned on at the first timing by the gate signal CKV1 output through the first gate line, and accordingly, the pixel electrodes electronically connected with the first gate line may be electronically connected with the data line connected with the data driving unit 122 at the first timing. The data driving unit 122 may apply a first data voltage to the pixel electrodes electronically connected with the first gate line during a predetermined (e.g., specified) time from the first timing according to a driving control signal, and accordingly, the pixel electrodes electronically connected with the first gate line may be charged by the first data voltage applied by the data driving unit 122.

The plurality of switching elements connected with the second gate line may be turned on at the second timing by the gate signal CKV2 output through the second gate line, and accordingly, the pixel electrodes electronically connected with the second gate line may be electronically connected with the data line connected with the data driving unit 122 during the predetermined time from the second timing.

Further, as described above, the data driving unit 122 applies the first data voltage to the pixel electrodes electronically connected with the data line during the predetermined time from the first timing according to a driving control signal, and accordingly, in the pixel electrodes electronically connected with the second gate line, a part of the first data voltage applied by the data driving unit 122 may be charged.

The processor 130 may control the gate driving unit 121 to output a gate signal CKV3 to the plurality of switching elements connected with a third gate line through the third gate line at a third timing, and control the gate driving unit 121 to output a gate signal CKV4 to the plurality of switching elements connected with a fourth gate line through the fourth gate line at a fourth timing.

Here, the plurality of switching elements connected with the third and fourth gate lines may be turned on by the gate signals CKV3, CKV4 that are output through the gate lines.

For example, the plurality of switching elements connected with the third gate line may be turned on by the gate signal CKV3 output through the third gate line at the third timing, and accordingly, the pixel electrodes electronically connected with the third gate line may be electronically connected with the data line connected with the data driving unit 122 at the third timing. The data driving unit 122 may apply a second data voltage to the pixel electrodes electronically connected with the third gate line during the predetermined time from the third timing according to a driving control signal, and accordingly, the pixel electrodes electronically connected with the third gate line may be charged by the second data voltage applied by the data driving unit 122.

As described above, the pixel electrodes electronically connected with the second gate line may be electronically connected with the data line connected with the data driving unit 122 during the predetermined time from the second timing. As an example, the pixel electrodes electronically connected with the second gate line may be electronically connected with the data line providing the first data voltage during a first time from the second timing, and may be electronically connected with the data line providing the second data voltage during a second time from the third timing. The time that summed up the first time and the second time may be the aforementioned predetermined time. Accordingly, the pixel electrodes electronically connected with the second gate line may be charged by the first data voltage during the first time, and may be charged by the second data voltage during the second time.

For example, the plurality of pixels connected with the second gate line may be charged by the first data voltage during the first time based on the aforementioned second timing, and may be charged by the second data voltage during the second time.

Accordingly, the plurality of pixels connected with the second gate line may be charged by a third value which is between the first value by which the plurality of pixels connected to the first gate line are charged by the first data voltage and the second value by which the plurality of pixels connected to the third gate line are charged by the second data voltage. The third value may be a median value of the first value and the second value, but is not necessarily limited thereto.

In a similar manner, the pixel electrodes electronically connected with the fourth gate line may be electronically connected with the data line connected with the data driving unit 122 during the predetermined time from the fourth timing. As an example, the pixel electrodes electronically connected with the fourth gate line may be electronically connected with the data line providing the second data voltage during the first time from the fourth timing, and may be electronically connected with the data line providing the third data voltage during the second time from the fifth timing that will be described in greater detail below. Accordingly, the pixel electrodes electronically connected with the fourth gate line may be charged by the second data voltage during the first time, and may be charged by the third data voltage during the second time.

In such a manner, the gate driving unit 121 may output a gate signal CKV5 to the plurality of switching elements connected with a fifth gate line through the fifth gate line at a fifth timing, and output a gate signal CKV6 to the plurality of switching elements connected with a sixth gate line through the sixth gate line at a sixth timing. Accordingly, a third data voltage output by the data driving unit 122 may be charged in the plurality of pixels electronically connected with the fifth gate line, and a part of the third data voltage and a part of a fourth data voltage output by the data driving unit 122 may be charged in the plurality of pixels electronically connected with the sixth gate line.

The gate driving unit 121 may output a gate signal CKV7 to the plurality of switching elements connected with a seventh gate line through the seventh gate line at a seventh timing, and output a gate signal CKV8 to the plurality of switching elements connected with an eighth gate line through the eighth gate line at an eighth timing. Accordingly, the fourth data voltage output by the data driving unit 122 may be charged in the plurality of pixels electronically connected with the seventh gate line, and a part of the fourth data voltage and a part of a fifth data voltage output by the data driving unit 122 may be charged in the plurality of pixels electronically connected with the eighth gate line.

Based on a difference between a data voltage applied to the pixel electrodes and a common voltage applied to the common electrodes, the liquid crystal particles included in each pixel may vary their alignments. Accordingly, the light transmittance rates of each pixel change according to the aforementioned application of a data voltage, and the display panel 110 implements a gray scale according to the change of the light transmittance rates.

As described above, when compared with a conventional display device outputting gate signals one gate line at a time, gate signals may be output at least two gate lines at a time according the disclosure, and thus high speed driving is possible, and accordingly, an HFR image can be reproduced without discontinuity. For example, in the case of a conventional display device operating in a driving frequency of 60 (Hz), there is a problem that image data that needs a driving frequency of 120 (Hz) cannot be reproduced smoothly. However, in the disclosure, even in case 60 (Hz) is set as the basic driving frequency of a display device, the device can operate in a driving frequency of 120 (Hz) or higher by outputting gate signals at least two gate lines at a time, and accordingly, an HFR image that needs a driving frequency of 120 (Hz), etc. can be reproduced without discontinuity.

According to the disclosure, output timings of gate signals output in each gate line are controlled to be different in outputting gate signals at least two gate lines at a time, and accordingly, compensation for degradation of a resolution can be performed. For example, when compared to a case of outputting gate signals at least two gate lines at a time at the same timing, in the disclosure, degradation of a resolution can be compensated through image quality interpolation among pixel lines.

In the above, an example of outputting gate signals two gate lines at a time was explained, but in the disclosure, according to a frame rate of image data, fps of image data, etc., gate signals may be output, for example, at least three gate lines at a time.

The output timings of gate signals and the output timings of data voltages illustrated in FIG. 3 are merely non-limiting illustrative examples, and timings that the gate driving unit 121 outputs gate signals and timings that the data driving unit 122 outputs data voltages may be different from those of FIG. 3. For example, timings that the gate driving unit 121 outputs gate signals and timings that the data driving unit 122 outputs data voltages can be set or changed in various ways depending on circumstances.

Meanwhile, the processor 130 may control the gate driving unit 121 to output gate signals one gate line at a time, or at least two gate lines at a time according to the mode of the display device.

For example, in the first mode, for processing image data in the first driving frequency, the processor 130 may control the panel driving unit 120 (e.g., the gate driving unit 121) to sequentially output gate signals one gate line at a time, and in the second mode, for processing image data in the second driving frequency that is higher than the first driving frequency, the processor 130 may control the panel driving unit 120 (e.g., the gate driving unit 121) to output gate signals at least two gate lines at a time.

The operation of the display device 100 according to the second mode is as explained above in FIG. 3.

Hereinafter, the operation of the display device 100 according to the first mode will be explained in greater detail below with reference to FIG. 4.

The processor 130 may process image data received from the outside as the basic driving frequency.

For example, the processor 130 may process image data in a driving frequency set in the display device 100 in advance. The predetermined driving frequency may be, for example, 60 (Hz), but is not necessarily limited thereto.

For this, the processor 130 may control the panel driving unit 120 to sequentially output gate signals one gate line at a time. The panel driving unit 120 may be the aforementioned gate driving unit 121.

For example, the processor 130 may transmit a scan initiating signal including information on start of scan, and a clock control signal for controlling output timings of gate signals one gate line at a time to the gate driving unit 121, and the gate driving unit 121 may adjust the output timings of gate signals one gate line at a time according to the scan initiating signal and the clock control signal, and thereby sequentially output gate signals one gate line at a time.

While operating in the first mode, the processor 130 may control the panel driving unit 120 to apply a data voltage to the plurality of pixels based on the output timing of the gate signals that are sequentially output to the plurality of switching elements one gate line at a time.

Figure 4:
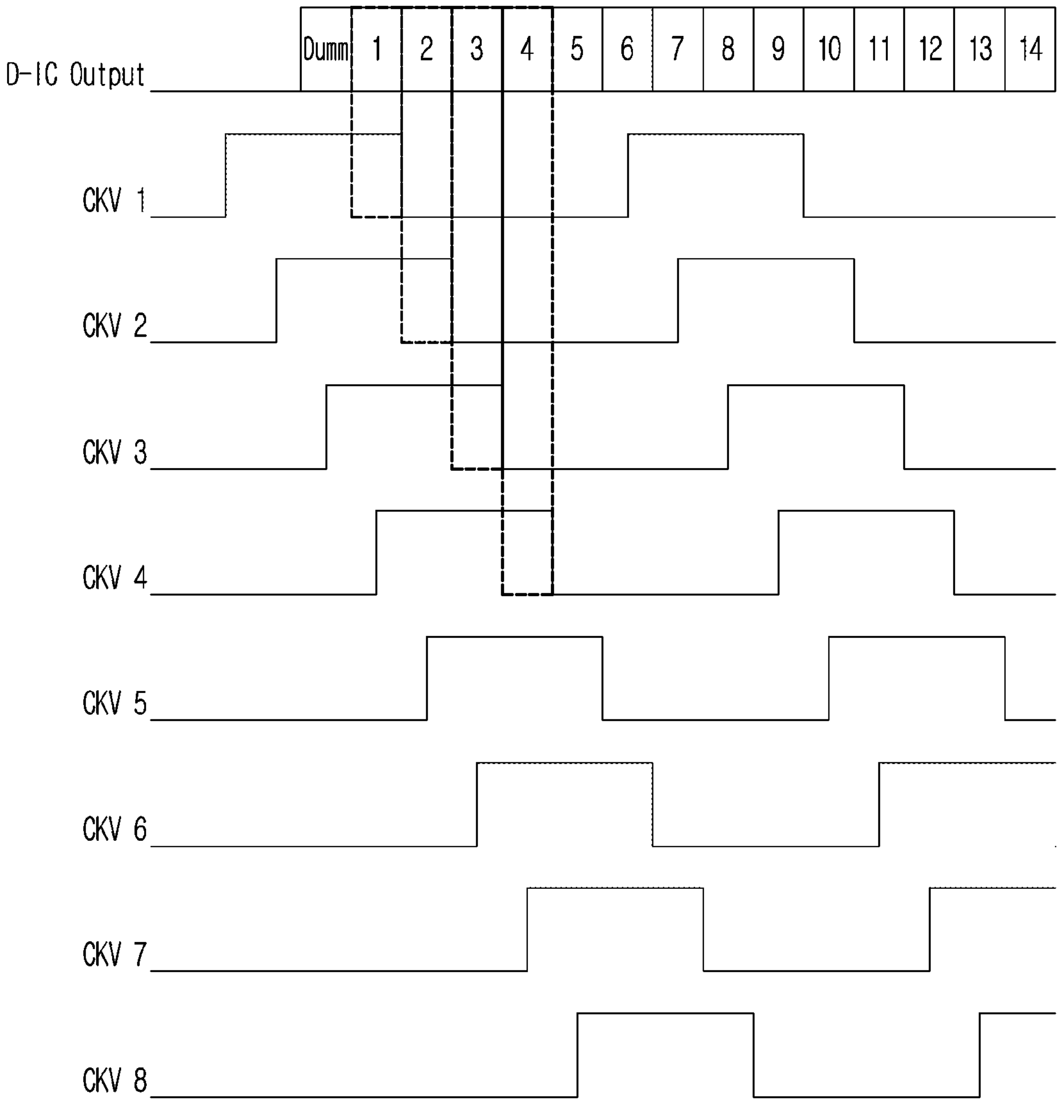
FIG. 4 is a diagram illustrating an example of sequentially outputting gate signals one gate line at a time according to various embodiments.

As an example, referring to FIG. 4, the gate driving unit 121 according to an embodiment of the disclosure may be connected with the first to eight gate lines, and the processor 130 may control the gate driving unit 121 to output gate signals one gate line at a time.

In this case, the gate driving unit 121 may output the gate signal CKV1 to the plurality of switching elements connected with the first gate line through the first gate line at the first timing.

Accordingly, the plurality of switching elements connected with the first gate line may be turned on by the gate signal output through the first gate line. As the switching elements are turned on, the pixel electrodes included in the pixels may be electronically connected with the data line connected with the data driving unit 122.

Accordingly, the first data voltage output by the data driving unit 122 may be applied to the pixel electrodes connected with the turned-on switching elements through the plurality of data lines.

The gate driving unit 121 may output the gate signal CKV2 to the plurality of switching elements connected with the second gate line through the second gate line at the second timing.

The plurality of switching elements connected with the second gate line may be turned on by the gate signal output through the gate line. Then, as the switching elements are turned on, the pixel electrodes included in the pixels may be electronically connected with the data line connected with the data driving unit 122.

Accordingly, the second data voltage output by the data driving unit 122 may be applied to the pixel electrodes connected with the turned-on switching elements through the plurality of data lines.

For example, while operating in the first mode, the processor 130 may control the panel driving unit 120 to output the first gate signal to the plurality of switching elements connected to the first gate line through the first gate line at the first timing, so that the first data voltage is charged in the plurality of pixels connected with the first gate line, and control the panel driving unit 120 to output the second gate signal to the plurality of switching elements connected to the second gate line through the second gate line at the second timing, so that the second data voltage is charged in the plurality of pixels connected with the second gate line.

In a similar manner, the gate driving unit 121 may output a gate signal CKVn to the plurality of switching elements connected to an nth gate line through the nth gate line at an nth timing, and the nth data voltage output by the data driving unit 122 may be applied to the pixel electrodes connected with the turned-on switching elements through the plurality of data lines.

Meanwhile, the output timings of gate signals and the output timings of data voltages illustrated in FIG. 4 are merely non-limiting examples, and timings that the gate driving unit 121 outputs gate signals and timings that the data driving unit 122 outputs data voltages may be different from those of FIG. 4. That is, timings that the gate driving unit 121 outputs gate signals and timings that the data driving unit 122 outputs data voltages can be set or changed in various ways depending on embodiments.

According to the aforementioned application of the first to nth data voltages, the light transmittance rates of each pixel are changed, and the display panel 110 implements a gray scale according to the change of the light transmittance rates.

Meanwhile, the mode of the display device 100 may be set according to a user instruction received through an input unit (e.g., including input circuitry).

For example, if a user instruction for setting the mode of the display device 100 as the first mode is received through an input unit, the processor 130 may operate in the first mode and process image data in the first driving frequency, and if a user instruction for setting the mode of the display device 100 as the second mode is received through the input unit, the processor 130 may operate in the second mode and process image data in the second driving frequency that is higher than the first driving frequency.

The feature of processing in the first driving frequency may be controlling the gate driving unit 121 to sequentially output gate signals one gate line at a time, and the feature of processing in the second driving frequency may be controlling the gate driving unit 121 to output gate signals at different timings at least two gate lines at a time.

The input unit may not only be a keyboard, a mouse, etc., but it may also be a touch screen. Also, the input unit is a communication unit, and if a signal corresponding to a user instruction for setting or changing the mode of the display device 100 is received from an external device through the communication unit, the processor 130 may set the mode of the display device 100 as the first mode or the second mode based on the user instruction. For this, the processor 130 may display a user interface (UI) for setting the mode of the display device on the screen of the display panel 110.

The processor 130 may automatically set or change the mode of the display device 100.

As an example, if image data is received from the outside, the processor 130 may perform an automatic content recognition (ACR) function and determine the type of the image data. The ACR function may refer, for example, to a technology of recognizing image data by extracting image information or sound information of a content, and as an example, the ACR function may be a technology of comparing image information or sound information extracted from a content with pre-stored image information or sound information, and obtaining information on the title, the type, etc. of the content. For this, the display device 100 may have stored image information or sound information for a plurality of contents. Alternatively, the processor 130 may extract image information or sound information from image data, and transmit the extracted image information or sound information to an external device (e.g., a server), and receive information on the title, the type, etc. of the content determined based on the image information or the sound information of the image data from the external device.

If the type of the image data is determined as a first type through the ACR function, the processor 130 may operate in the first mode and process the image data in the first driving frequency, and if the type of the image data is determined as a second type, the processor 130 may operate in the second mode and process the image data in the second driving frequency.

The image of the first type may be a general broadcasting image, etc., and the image of the second type may be a game image or a sport image, but the images are not necessarily limited thereto.

The processor 130 may set or change the mode of the display device 100 based on the frames per second (fps) of image data received from the outside.

For this, when image data is received from the outside, the processor 130 may determine the frames per second (fps) of the image data. As an example, the processor 130 may determine the fps of the image data based on the meta information of the image data.

If the fps of the image data is a first value, the processor 130 may operate in the first mode and process the image data in the first driving frequency, and if the fps of the image data is a second value, the processor 130 may operate in the second mode and process the image data in the second driving frequency.

The first value may be 60 (fps), and the second value may be 120 (fps), but the values are not necessarily limited thereto. For this, information on the first and second values may have been stored in the display device 100.

The processor 130 may change the fps (or, the frame rate) of image data received from the outside, and process the image data through high speed driving.

As an example, if first image data having the fps of the first value is received from the outside, the processor 130 may convert the image data into second image data having the fps of the second value, and process the second image data in the second driving frequency.

The first value may be 60 (fps), and the second value may be 120 (fps), but the values are not necessarily limited thereto.

For this, the display device 100 may further include a frame rate converter (FRC) for conversion of the fps of image data or the frame rate of image data.

If the fps of image data is determined as the first value based on the meta information of the image data received from the outside, the processor 130 may convert the fps of the image data into the second value through the FRC, and process the image data in the second driving frequency.

Figure 5:
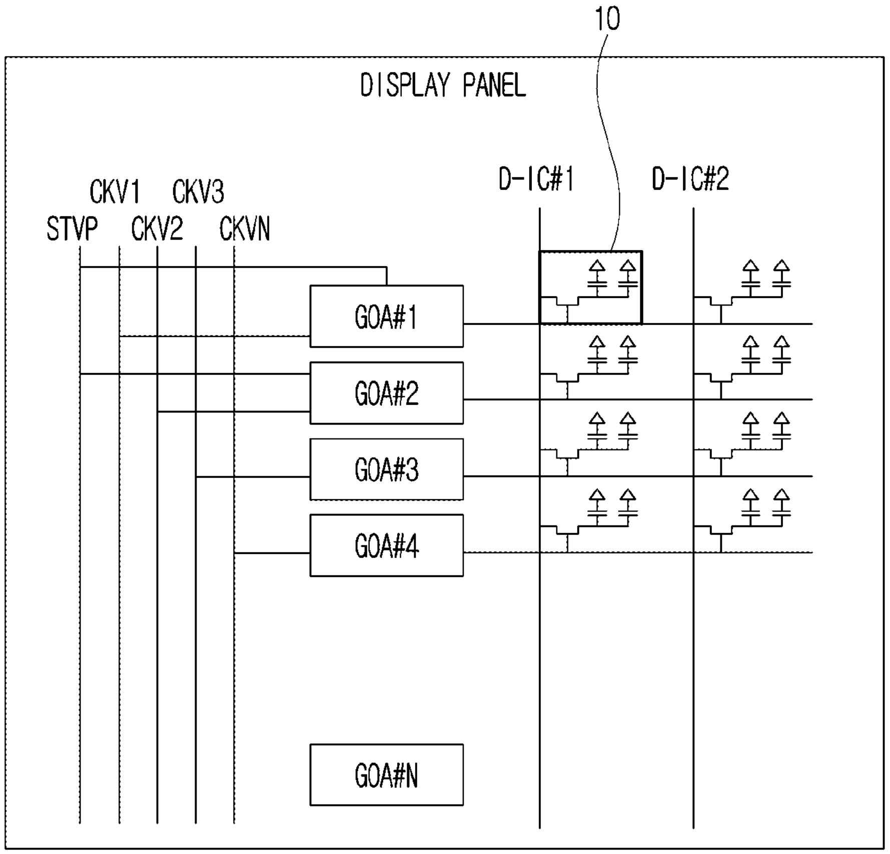
FIG. 5 is a diagram illustrating an example configuration of a display device according to various embodiments.

The gate driving unit 121 in FIG. 2 may also be implemented as a gate driver on array (GOA) as illustrated in FIG. 5. The GOA may refer, for example, to a data driving circuit performing the aforementioned function of the gate driving unit 121 that is manufactured on a substrate around the pixels, and the GOA may output gate signals one gate line at a time, or at least two gate lines at a time according to control by the processor 130.

When a gate signal is output along the gate line by the GOA, the pixel electrode of the pixel 10 (the capacitor on the left side of the reference numeral 10) and a data line may be electronically connected, and accordingly, a data voltage may be applied to the pixel electrode through the data line. Based on a difference between the pixel electrode of the pixel 10 and the common electrode (the capacitor on the right side of the reference numeral 10), the arrangement of the liquid crystal particles included in the pixel 10 may vary, and the light transmittance rate of the pixel 10 may change according to the arrangement of the liquid crystal particles, and the pixel 10 may implement a gray scale according to the change of the light transmittance rate.

Figure 6:
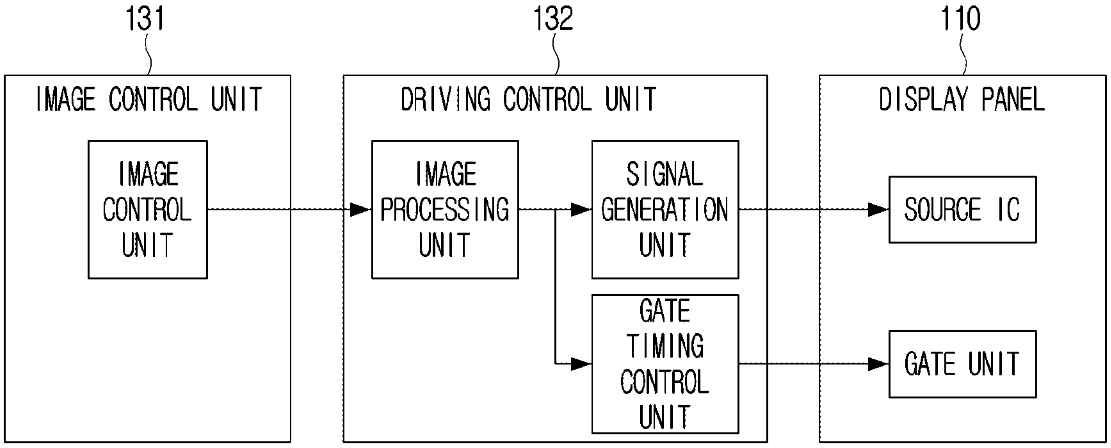
FIG. 6 is a block diagram illustrating an example configuration of a display device according to various embodiments.

FIG. 6 is a block diagram illustrating an example configuration of a display device according to various embodiments.

In FIG. 2, the display panel 110 and the panel driving unit 120 were illustrated separately, for convenience of explanation, but the panel driving unit 120 may be included in the display panel 110 as illustrated in FIG. 6.

The processor 130 in FIG. 2 may not only be implemented as one component, but it may also be implemented as separate components like the image control unit 131 and the driving control unit 132 in FIG. 6.

The image control unit 131 may include various circuitry and receive image data from the outside, and determine a driving frequency for processing of the image data. For this, the image control unit 131 may determine the type of the image data through the aforementioned ACR function, or determine the frame rate or the fps of the image data based on the meta information of the image data.

The image control unit 131 may determine the driving frequency of the display device 100 based on the type of the image data, the frame rate or the fps of the image data, and control the driving control unit 132 to process the image data in the driving frequency.

The image control unit 131 may determine the driving frequency of the display device 100 based on the mode of the display device 100 selected according to a user instruction, and control the driving control unit 132 to process the image data in the driving frequency.

The driving control unit 132 may process the image data in the basic driving frequency or a high speed driving frequency according to control by the image control unit 131. The basic driving frequency may be the aforementioned first driving frequency, and the high speed driving frequency may be the aforementioned second driving frequency.

For example, when a control signal for processing image data in the first driving frequency and image data are received from the image control unit 131, an image processing unit of the driving control unit 132 may process the image data as image data corresponding to the first driving frequency. A signal generation unit of the driving control unit 132 may generate an image signal corresponding to the plurality of pixels in a horizontal line based on the image data corresponding to the first driving frequency, and transmit the signal to a source IC (it may become the aforementioned data driving unit) of the display panel 110.

A gate timing control unit of the driving control unit 132 may transmit a signal for outputting gate signals one gate line at a time to process the image data in the first driving frequency to a gate unit (it may become the aforementioned gate driving unit) of the display panel 110.

In case a control signal for processing image data in the second driving frequency and image data were received from the image control unit 131, the image processing unit of the driving control unit 132 may process the image data as image data corresponding to the second driving frequency. The signal generation unit of the driving control unit 132 may generate an image signal corresponding to the plurality of pixels in a horizontal line based on the image data corresponding to the second driving frequency, and transmit the signal to the source IC of the display panel 110.

The gate timing control unit of the driving control unit 132 may transmit a signal for outputting gate signals at least two gate lines at a time to process the image data in the second driving frequency to the gate unit of the display panel 110. Here, the respective gate signals may have different output timings as described above.

Figure 7:
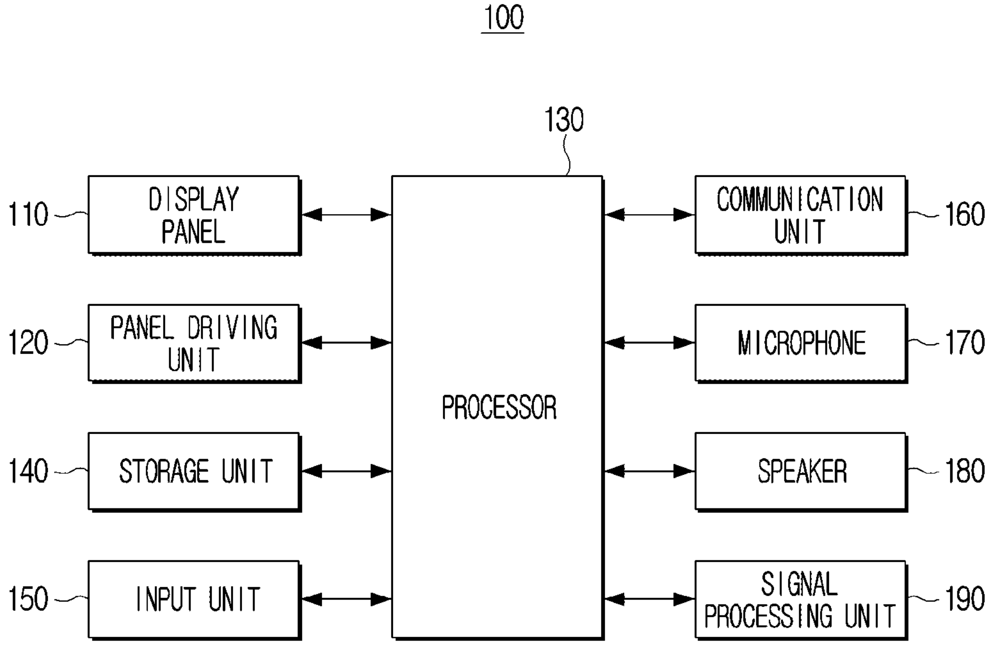
FIG. 7 is a block diagram illustrating an example configuration of a display device according to various embodiments.

FIG. 7 is a block diagram illustrating an example configuration of a display device according to various embodiments.

Referring to FIG. 7, the display panel 100 according to an embodiment of the disclosure may include a display panel 110, a panel driving unit (e.g., including driving circuitry) 120, a storage unit (e.g., a memory) 140, an input unit (e.g., including input circuitry) 150, a communication unit (e.g., including communication circuitry) 160, a microphone 170, a speaker 180, a signal processing unit (e.g., including signal processing circuitry) 190, and a processor (e.g., including processing circuitry) 130. Hereinafter, parts that overlap with the aforementioned explanation may not be repeated, or may be explained in an abridged form.

The storage unit 140 may include a memory and store an operating system (OS) for controlling the overall operations of the components of the display device 100, and instructions or data related to the components of the display device 100.

The processor 130 may include various processing circuitry and control a plurality of hardware or software components of the display device 100 using the various instructions or data, etc. stored in the storage unit 140, and load instructions or data received from at least one of other components on a volatile memory and process them, and store various data in a non-volatile memory.

The input unit 150 may include various input circuitry and receive inputs of various user instructions. The processor 130 may execute a function corresponding to a user instruction inputted through the input unit 150.

For example, the input unit 150 may receive an input of a user instruction for setting the mode of the display device 100. The input unit 150 may receive inputs of user instructions for performing turning on, change of the channel, adjustment of the volume, etc., and the processor 130 may turn on the display device 100, or perform change of the channel, adjustment of the volume, etc. according to the input user instructions.

For this, the input unit 150 may be implemented as an input panel. The input panel may be implemented in forms of a touch pad, or a keypad including various kinds of function keys, number keys, special keys, character keys, etc., or a touch screen.

The communication unit 160 may include various communication circuitry and communicate with an external device, and transmit and receive various data. For example, the communication unit 160 may not only perform communication with an electronic device through a near field communication network (a local area network (LAN)), an Internet network, and a mobile communication network, but it may also perform communication with an electronic device through various communication methods such as Bluetooth (BT), Bluetooth Low Energy (BLE), Wireless Fidelity (WI-FI), Zigbee, NFC, etc.

For this, the communication unit 160 may include various communication modules for performing network communication. For example, the communication unit 160 may include a Bluetooth chip, a Wi-Fi chip, a wireless communication chip, etc.

For example, the communication unit 160 may perform communication with an external device, and receive image data from the external device. The external device may be a server, a smartphone, a computer, a laptop computer, etc., but is not necessarily limited thereto.

The microphone 170 may receive a user voice. The user voice may be a voice for executing a specific function of the display device 100. If a user voice is received through the microphone 170, the processor 130 may analyze the user voice through a speech to text (STT) algorithm, and perform a function corresponding to the user voice.

As an example, if a user voice for setting the mode of the display device 100 is received through the microphone 170, the processor 130 may operate in the first mode according to the user voice and process the image data in the first driving frequency, or operate in the second mode and process the image data in the second driving frequency.

The speaker 180 may output various sounds. For example, the speaker 180 may output sounds corresponding to image data.

The signal processing unit 190 may include various signal processing circuitry and performs signal processing for image data received through the communication unit 160. For example, the signal processing unit 190 may perform operations such as decoding, scaling, and frame rate conversion, etc. of images including image data, and process the image data as a signal in a form that can be output from the display device 100. The signal processing unit 190 may perform signal processing such as decoding, etc. for an audio signal, and process the audio signal as a signal in a form that can be output from the speaker 180.

Figure 8:
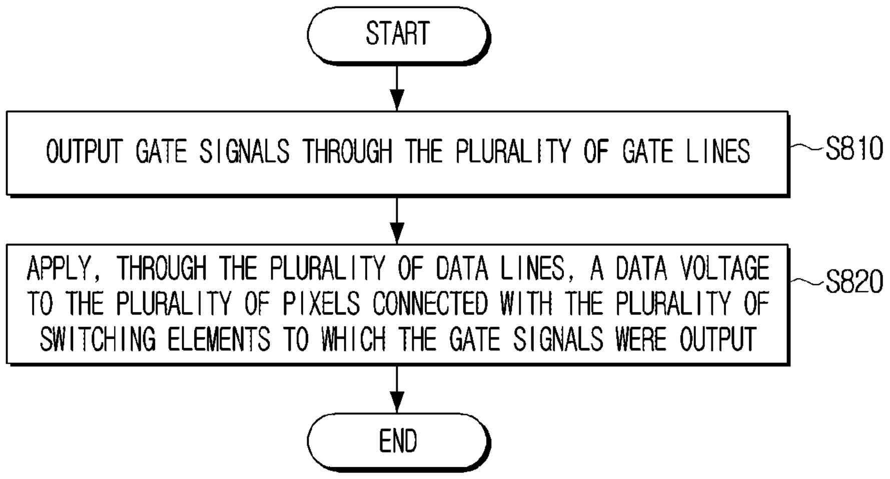
FIG. 8 is a flowchart illustrating an example method of controlling a display according to various embodiments.

FIG. 8 is a flowchart illustrating an example method of controlling a display device according to various embodiments.

The display device 100 may output gate signals through a plurality of gate lines in operation S810.

For example, in the first mode, for processing image data in the first driving frequency, the display device 100 may sequentially output gate signals to the plurality of gate lines one gate line at a time, and in the second mode, for processing image data in the second driving frequency, the display device 100 may sequentially output gate signals to the plurality of gate line at least two gate lines at a time.

In the second mode, the respective gate signals output to the plurality of gate lines at least two gate lines at a time may have output timings different from each other.

The display device 100 may apply, through the plurality of data lines, a data voltage to the plurality of pixels connected with the plurality of switching elements to which the gate signals were output in operation S820.

For example, while operating in the first mode, the display device 100 may apply a data voltage to the plurality of pixels based on the timing of sequentially outputting the gate signals to the plurality of switching elements one gate line at a time.

While operating in the second mode, the display device 100 may apply a data voltage to the plurality of pixels based on different output timings of the respective gate signals that are output to the plurality of switching elements at least two gate lines at a time.

The mode of the display device 100 may not only be determined based on a user instruction received through the input unit, but it may also be determined based on the type of image data, the fps of image data, or the frame rate of image data.

Depending on embodiments, the display device 100 may convert the fps of image data, and process the image data in a high speed driving frequency.

The methods according to the various example embodiments of the disclosure as described above may be implemented in forms of software or applications that can be installed on conventional display devices.

The methods according to the various example embodiments of the disclosure as described above may be implemented just with software upgrade, or hardware upgrade of conventional display devices.

In addition, the various example embodiments of the disclosure as described above may be performed through an embedded server provided on a display device, or an external server of a display device.

Meanwhile, a non-transitory computer readable medium storing a program that sequentially performs the control method for a display device according to the disclosure may be provided.

A non-transitory computer readable medium refers to a medium that stores data semi-permanently, and is readable by machines. For example, the aforementioned various applications or programs may be provided while being stored in a non-transitory computer readable medium such as a CD, a DVD, a hard disk, a blue-ray disk, a USB, a memory card, a ROM and the like.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of controlling a display device, the method comprising:

outputting gate signals through a plurality of gate lines including a first gate line, a second gate line and a third gate line; and applying, through a plurality of data lines, a data voltage to a plurality of pixels connected with a plurality of switching elements to which the gate signals were output, wherein the outputting the gate signals comprises:

in a first mode, sequentially outputting gate signals to the plurality of gate lines one gate line at a time to process image data in a first driving frequency; and in a second mode, outputting gate signals to the plurality of gate lines at least two gate lines at a time to process image data in a second driving frequency higher than the first driving frequency, wherein, in the second mode, respective ones of the gate signals output to the plurality of gate lines at least two gate lines at a time have output timings different from each other, and outputting the gate signals to the plurality of gate lines at least two gate lines at a time includes:

outputting a first gate signal to a plurality of switching elements connected to the first gate line through the first gate line at a first timing, outputting a second gate signal to a plurality of switching elements connected to the second gate line through the second gate line at a second timing, and outputting a third gate signal to a plurality of switching elements connected to the third gate line through the third gate line at a third timing, wherein a plurality of pixels connected with the second gate line are charged by a third value based on a first value by which a plurality of pixels connected to the first gate line are charged and a second value by which a plurality of pixels connected to the third gate line are charged, and wherein the third value is different from the first value and the second value.

2. The method of claim 1, wherein the applying the data voltage comprises:

while operating in the first mode, applying a data voltage to the plurality of pixels based on the output timings of the gate signals sequentially output to the plurality of switching elements one gate line at a time; and while operating in the second mode, applying a data voltage to the plurality of pixels based on the different output timings of the respective gate signals output to the plurality of switching elements at least two gate lines at a time.

3. The method of claim 1, wherein the outputting the gate signals comprises:

while operating in the first mode, outputting a first gate signal to a plurality of switching elements connected to the first gate line through the first gate line at a first timing, so that a first data voltage is charged in a plurality of pixels connected with the first gate line, and outputting a second gate signal to a plurality of switching elements connected to the second gate line through the second gate line at a second timing, so that a second data voltage is charged in a plurality of pixels connected with the second gate line.

4. The method of claim 1, wherein the first gate signal is output to the plurality of switching elements connected to the first gate line through the first gate line at the first timing, so that a first data voltage is charged in the plurality of pixels connected with the first gate line, and the second gate signal is output to the plurality of switching elements connected to the second gate line through the second gate line at the second timing, so that the first data voltage and a second data voltage are charged in the plurality of pixels connected with the second gate line.

5. The method of claim 4, wherein the plurality of pixels connected with the second gate line are charged by the first data voltage during a first time based on the second timing, and are charged by the second data voltage during a second time.

6. A display device comprising:

a panel driving unit comprising panel driving circuitry;

a display panel including a plurality of pixels connected with a plurality of gate lines and a plurality of data lines through a plurality of switching elements comprising switching circuitry; and a processor configured to: control the panel driving unit to output gate signals through the plurality of gate lines including a first gate line, a second gate line and a third gate line, and control the panel driving unit to apply, through the plurality of data lines, a data voltage to the plurality of pixels connected with the plurality of switching elements to which the gate signals were output, wherein the processor is configured to:

in a first mode, control the panel driving unit to sequentially output gate signals to the plurality of gate lines one gate line at a time to process image data in a first driving frequency, and in a second mode, control the panel driving unit to output gate signals to the plurality of gate lines at least two gate lines at a time to process image data in a second driving frequency higher than the first driving frequency, wherein, in the second mode, respective ones of the gate signals output to the plurality of gate lines at least two gate lines at a time have output timings different from each other, and controlling the panel driving unit to output the gate signals to the plurality of gate lines at least two gate lines at a time includes:

controlling the panel driving unit to output a first gate signal to a plurality of switching elements connected to the first gate line through the first gate line at a first timing, controlling the panel driving unit to output a second gate signal to a plurality of switching elements connected to the second gate line through the second gate line at a second timing, and controlling the panel driving unit to output a third gate signal to a plurality of switching elements connected to the third gate line through the third gate line at a third timing, wherein a plurality of pixels connected with the second gate line are charged by a third value based on a first value by which a plurality of pixels connected to the first gate line are charged and a second value by which a plurality of pixels connected to the third gate line are charged, and wherein the third value is different from the first value and the second value.

7. The display device of claim 6, wherein the processor is configured to:

while operating in the first mode, control the panel driving unit to apply a data voltage to the plurality of pixels based on the output timings of the gate signals sequentially output to the plurality of switching elements one gate line at a time, and while operating in the second mode, control the panel driving unit to apply a data voltage to the plurality of pixels based on the different output timings of the respective gate signals output to the plurality of switching elements at least two gate lines at a time.

8. The display device of claim 6, the processor is configured to:

while operating in the first mode, control the panel driving unit to output a first gate signal to a plurality of switching elements connected to the first gate line through the first gate line at a first timing, so that a first data voltage is charged in a plurality of pixels connected with the first gate line, and control the panel driving unit to output a second gate signal to a plurality of switching elements connected to the second gate line through the second gate line at a second timing, so that a second data voltage is charged in a plurality of pixels connected with the second gate line.

9. The display device of claim 6, wherein the first gate signal is output to the plurality of switching elements connected to the first gate line through the first gate line at the first timing, so that a first data voltage is charged in the plurality of pixels connected with the first gate line, and the second gate signal is output to the plurality of switching elements connected to the second gate line through the second gate line at the second timing, so that the first data voltage and a second data voltage are charged in the plurality of pixels connected with the second gate line.

10. The display device of claim 9, wherein the plurality of pixels connected with the second gate line are charged by the first data voltage during a first time based on the second timing, and are charged by the second data voltage during a second time.

11. The display device of claim 9, wherein the third gate signal output to the plurality of switching elements connected to the third gate line through the third gate line at the third timing, so that the second data voltage is charged in the plurality of pixels connected with the third gate line.

12. The display device of claim 6, wherein the processor is configured to:

based on receiving image data from the outside, perform an automatic content recognition (ACR) function and determine a type of the image data, based on the type of the image data being determined as a first type, operate in the first mode and process the image data in the first driving frequency, and based on the type of the image data being determined as a second type, operate in the second mode and process the image data in the second driving frequency.

13. The display device of claim 6, wherein the processor is configured to:

based on receiving image data from outside, determine frames per second (fps) of the image data, and based on the fps of the image data being a first value, operate in the first mode and process the image data in the first driving frequency, and based on the fps of the image data being a second value, operate in the second mode and process the image data in the second driving frequency.

14. The display device of claim 6, wherein the processor is configured to:

based on receiving first image data having an fps of a first value from outside, convert the image data into second image data having an fps of a second value, and process the second image data in the second driving frequency.

* * * * *